(12) United States Patent
Phan Le

(10) Patent No.: US 8,395,111 B2
(45) Date of Patent: Mar. 12, 2013

(54) OPTICAL SYSTEM AND METHOD FOR DETECTING ROTATION OF AN OBJECT

(75) Inventor: Kim Phan Le, Eindhoven (NL)

(73) Assignee: NXP B.V., Eindhoven (NL)

( * ) Notice: Subject to any disclaimer, the term of this patent is extended or adjusted under 35 U.S.C. 154(b) by 377 days.

(21) Appl. No.: 12/751,981

(22) Filed: Mar. 31, 2010

(65) Prior Publication Data
US 2011/0240836 A1  Oct. 6, 2011

(51) Int. Cl.
G01D 5/34 (2006.01)
H01J 40/14 (2006.01)

(52) U.S. Cl. ............... 250/231.13; 250/214 R

(58) Field of Classification Search .......... 250/221, 250/231.13–231.19, 239, 214 R, 214.1; 356/614–622; 359/436, 439, 440; 341/13, 341/14; 33/1 R, 1 L, 1 SP, 1 PT, 1 N
See application file for complete search history.

(56) References Cited

U.S. PATENT DOCUMENTS

| | | | | |
|---|---|---|---|---|
| 4,250,380 A | * | 2/1981 | Iyeta | 250/231.13 |
| 4,387,374 A | * | 6/1983 | Wiener | 342/183 |
| 5,983,720 A | * | 11/1999 | Crabb et al. | 73/514.26 |
| 7,034,282 B2 | * | 4/2006 | Oka et al. | 250/231.13 |
| 7,078,677 B2 | | 7/2006 | Chong et al. | |
| 2004/0227065 A1 | * | 11/2004 | Thorburn | 250/231.13 |
| 2005/0164623 A1 | | 7/2005 | Huynh | |
| 2006/0243895 A1 | * | 11/2006 | Nordenfelt et al. | 250/231.13 |
| 2007/0242060 A1 | | 10/2007 | Cheah | |
| 2010/0163716 A1 | * | 7/2010 | Villaret | 250/227.28 |

FOREIGN PATENT DOCUMENTS

| | | |
|---|---|---|
| EP | 1526644 B1 | 8/2009 |
| JP | 58198718 | 11/1983 |
| JP | 07-134016 A | 5/1995 |

* cited by examiner

Primary Examiner — Pascal M Bui Pho

(57) ABSTRACT

A includes a shaft having a length, a first end, and a second end; the second end has an oblique reflective surface defined thereon; the first end fixedly attached to the knob. Containing the shaft is a rotation body, having a receptacle to accommodate the second end of the shaft with the oblique reflective surface exposed. An integrated circuit optical module is optically coupled to the rotation body. The optical module detects a light irradiance profile from the oblique reflective surface and includes a solid state light source and a plurality of photo detectors which generate an electrical signal upon exposure to light. As the knob is rotated, the oblique reflective surface generates a changing asymmetric irradiance profile, the change being translated into an electrical signal via the photo detectors, which signal corresponds to the degree of rotation of the knob.

14 Claims, 3 Drawing Sheets

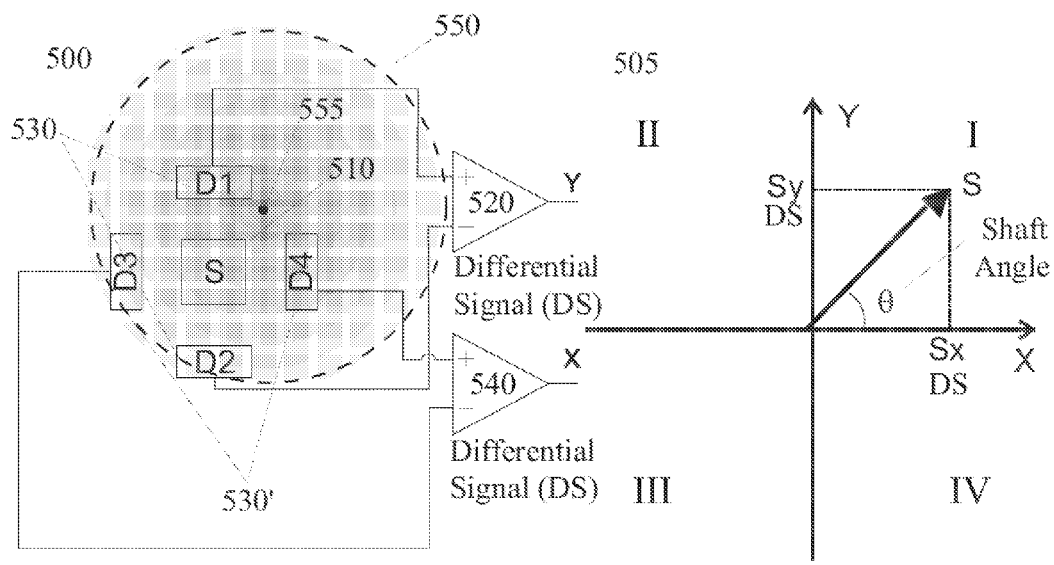
FIG. 5A
FIG. 5B
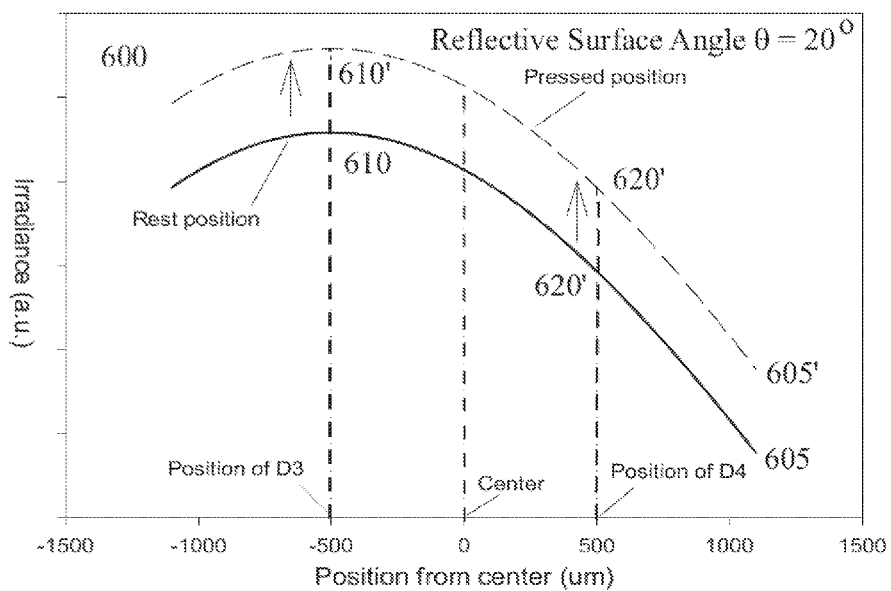
FIG. 6

OPTICAL SYSTEM AND METHOD FOR DETECTING ROTATION OF AN OBJECT

FIELD OF INVENTION

This invention relates to user interface devices. More particularly, this invention relates to an optical sensor device to measure the mechanical rotation and the rotational speed of a shaft. This shaft may be part of a dial or knob assembly in an electronic apparatus.

BACKGROUND

The world finds a myriad of electronic devices available to the user. For the user to take advantage of what a particular device has to offer, he must be able to interface with it. On such interface is the knob, found on practically every mechanical or electronic device. People learn to use this interface at an early age and quickly associate the turning of the knob as changing how the device operates—for instance, turn the knob clockwise to go to "high" and turn the knob counter-clockwise to go to "low." As in the case of a radio, the knob may be attached to a potentiometer; the user turns up the volume and the resistance of the potentiometer decreases, so that more of the output power from the radio's amplifier is directed to the speakers. During the turning of the knob, the user may encounter clicks and pops owing to a less than solid electrical connection of the rotating conductive contact and the surface of the variable resistor. Such pops may diminish the user's enjoyment of the listening experience, at a minimum or such pops may be large transient voltages sent to the speakers that damage them.

Furthermore, the mechanical nature of the potentiometer may limit its usefulness in small portable devices (i.e., PDAs, smart phones, tablet computers, etc.); the mechanics can only scale so far.

There exists a need for the familiar knob-based user interface which overcomes the shortcomings of a mechanical control that is suitable for modern electronic apparatus.

SUMMARY OF INVENTION

In applications, such as automotive sound systems, the user-interface should be familiar so that it is intuitive to use and readily recognizable in the complex environment of driving a car. The typical arrangement of the volume control knob and tuning knob provides an easy-to-use way to adjust the car's radio. To relate the degree of rotation of the knob to an adjustment of a desired parameter, an angle-sensor may be employed.

Angle sensors are used as parts of controllers in many applications. For instance, in many modern audio apparatus such as stereo sets, car radios, radio tuners, etc there are control knobs or dials for changing volume, tuning, or adjusting other preferences for the user. Behind the knobs (or otherwise associated therewith), there is an angle sensor to detect the angle position of the knob (i.e., how may degrees from a starting part has the knob been turned). In many robot arms there are angle sensors to detect the position of the arm in order to control it precisely. The angle sensor in some cases is also called an encoder. In modern brushless motors used e.g. in car windows, an angle sensor is used to timely activate the stator coils. In an even broader range of applications, many machines, such as automotive engines, robots, etc, use rotational speed sensors to control or monitor the engine speed, engine management, etc. These rotational speed sensors can be in fact angle sensors, or counters that only count rotations.

The encoders, angle sensors or rotational speed sensors can be based on optical, magnetic, or mechanical principles. The discussion herein, is focused towards sensors that work via optical principles.

In an example embodiment, there is a system for detecting the degree of rotation of a knob in an apparatus, the system comprises a shaft having a predetermined length and a first end and a second end, the second end having an oblique reflective surface defined thereon, the first end fixedly attached to the knob. A rotation body contains the shaft and the rotation body has a receptacle to accommodate the second end of the shaft, the oblique reflective surface of the second end being exposed. Optically coupled to the rotation body is an optical module. The optical module detects light irradiance from the exposed oblique reflective surface the optical module; the optical module being on an integrated circuit substrate. The optical module includes a solid state light source, a plurality of photo detectors each which generate an electrical signal upon exposure to light, arranged about the light source on a plane in at least two pairs, each pair defining a first and second direction parallel to the plane, the first and the second direction substantially perpendicular to each other. The oblique reflective surface generates an asymmetric irradiance profile as light from the solid-state light source is reflected back to the plurality of photo detectors. Each pair of photo detectors generates a first electrical signal and second electrical signal in response to the irradiance profile of the oblique reflective surface. The optical module detects a change in the asymmetric irradiance profile from the oblique reflective surface of the shaft as the knob is rotated.

In another embodiment, there is system for detecting the degree of rotation of a motor shaft; the motor shaft has an exposed oblique reflective surface defined thereon. The system comprises a rotation body accommodating the exposed oblique reflective surface of the motor shaft. An integrated circuit optical module optically couples the rotation body. The optical module contains a solid state light source and a plurality of photo detectors arranged to detect an asymmetric irradiance profile as light from the solid-state light source is reflected back from the exposed oblique reflective surface to the plurality of photo detectors. The plurality of photo detectors generates an output representing a vector having a magnitude and an angle, the vector representing the degree of rotation of the motor shaft.

In yet another embodiment, there is method for detecting the degree of rotation of a shaft in an apparatus; the shaft has a predetermined length and a first end and a second end; the second end has an oblique reflective surface defined thereon. The method comprises inserting the second end of the shaft into a rotation body having a receptacle to accommodate the second end of the shaft. An integrated circuit optical module is optically coupled to the rotation body; the optical module contains a solid state light source and a plurality of photo detectors. The asymmetric irradiance profile is detected as light from the solid-state light source is reflected back from the exposed oblique reflective surface to the plurality of photo detectors. From the plurality of photo detectors, an output representing a vector having a magnitude and angle is generated. The degree of rotation of the shaft is determined from the vector representation.

The above summaries of the present invention are not intended to represent each disclosed embodiment, or every aspect, of the present invention. Other aspects and example embodiments are provided in the figures and the detailed description that follow.

BRIEF DESCRIPTION OF THE DRAWINGS

The invention may be more completely understood in consideration of the following detailed description of various embodiments of the invention in connection with the accompanying drawings, in which:

FIG. 5A depicts a schematic of the sensor of FIG. 2 in relation to the underside of a knob's angled shaft;

FIG. 5B is a vector diagram that shows the angle of the shaft as a function of X-Y displacement; and FIG. 6 is a plot of the Irradiance Profile along the X-direction of the sensor as the knob is depressed by the user according to another embodiment of the present invention.

Figure 1:
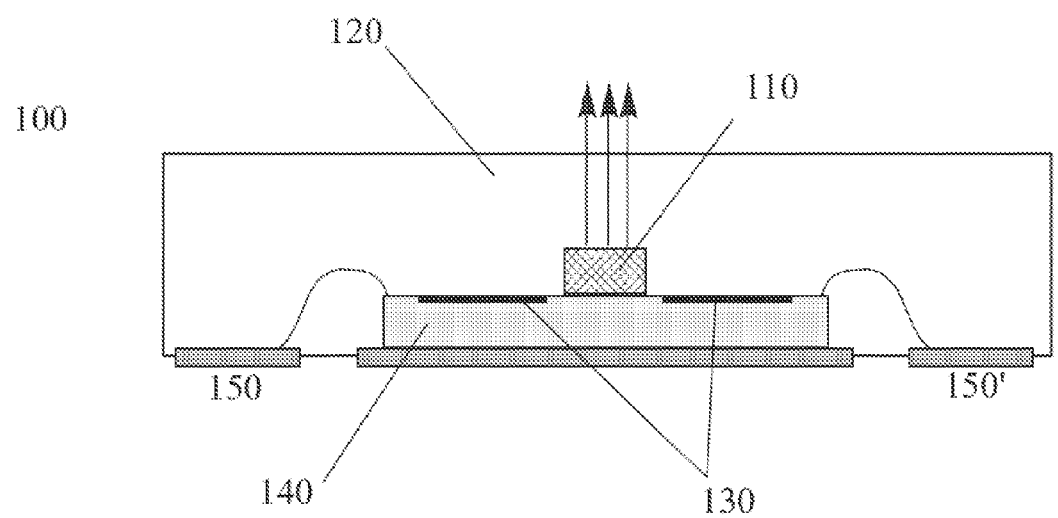
FIG. 1 depicts in cross-section an optical sensor module as applied to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims

DETAILED DESCRIPTION

The present invention has been found useful in measuring the angular displacement of a rotating shaft, particularly in control knobs in portable electronic apparatus that must make efficient use of space. Space is reduced by building the sensor on a silicon substrate.

The substrate includes a plurality of photo detectors arranged around a light source. The substrate that contains the photo detectors may also contain an integrated circuit for control and signal processing. When used in applications, a rotation shaft with a flat and polished end is placed in the vicinity of a sensor module. The polished end acts as a mirror. The surface of the reflector is slightly slanted with respect to the perpendicular cross-section of the shaft. Light comes from the light source, is reflected by the mirror and creates a light spot on the photo detectors. Light irradiance has an asymmetric distribution over the photo detectors, thus creating differential signals on the output of the processing circuit. When the shaft rotates, differential signals obtained from the photo detectors form a vector, whose angle corresponds to the angle position of the shaft.

In an example embodiment according to the present invention, the angle sensor has two separate components, (1) an optical sensor module which may be housed inside an integrated circuit (IC) package and (2) rotation body.

Refer to FIG. 1. The optical sensor module 100 contains a light source 110 and a number of photo detectors 130 fabricated on a common substrate 140 which is housed inside a package 120. The light source 110 is located at approximately the center of the substrate (other placement is also possible). On the substrate 140, a plurality of photo detectors 130 is arranged symmetrically around the light source 110. The light source 110 may be a light emitting diode (LED) die or an organic light emitting diode (OLED) structure. The photo detectors 130 may be silicon photo diodes or photo transistors, or photo resistors. The substrate may be a silicon die in which the optical sensor module 100 is part of an application specific integrated circuit (ASIC) providing a custom functionality for a particular apparatus (i.e., controlling, interfacing and processing signals, etc). The optical sensor module 100 connects to the outside world via bond pads 150, 150a, as with other portions of the substrate 140. Also the optical sensor module 100 may be a part of a system-on-a-chip (SoC). In other applications, the optical sensor module 100 may be a separate standalone product, as well.

The optical sensor module 100 may be placed in a package having a cavity above the light source and detectors area. The cavity may be left open or covered with a transparent lid. Alternatively the substrate can be molded inside a transparent compound 120 which seals the package. For the purpose of this disclosure, transparent means that the material can transmit without substantial attenuation the frequency of light emitted by the light source 110.

Figure 2:
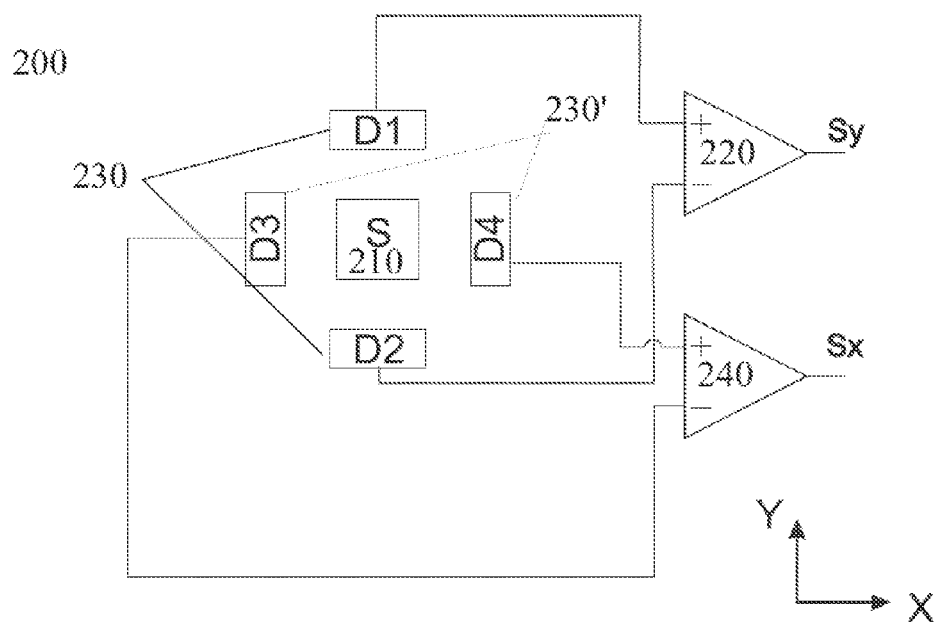
FIG. 2 is an electronic schematic of the optical sensor of FIG. 1.

Refer to FIG. 2. In an example sensor module as depicted in a circuit 200, four photo detectors 230 of any shape (D1-D4) are positioned symmetrically around a light source 210 (a non-symmetrical arrangement also could be used). Each photo detector can be partitioned into elements if necessary. The photo detectors 230 are connected to two differential amplifiers 220, 240, which give output signals Sx and Sy for the X- and Y-directions, respectively. PCT application of Kim Le Phan titled, "Optical Pointing Device" published on Oct. 15, 2009 (WO 2009/125360 A2) provides more detailed background information on the aforementioned discussion of the photo detector used in the present invention. The reader is referred to the Appendix.

In another example embodiment, the optical sensor module is combined with a rotation shaft as part of a system. When used in applications where angle position or rotation speed of a rotation body, such as knobs, dials, turning shafts, robot aims, etc, needs to be measured, the optical sensor module is placed in the vicinity of the rotation shaft.

Figure 3:
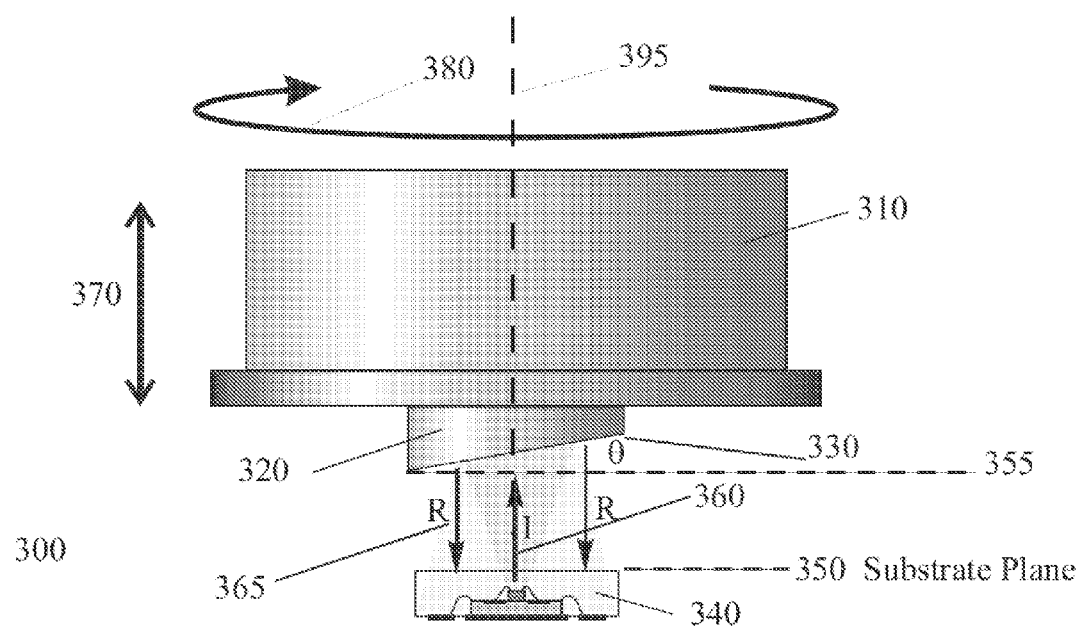
FIG. 3 depicts an arrangement of an angle sensing application as applied to a knob using the optical sensor module as depicted in FIG. 1, according to the present invention.

Refer to FIG. 3. In this example, there is arrangement 300 of an angle sensing application using an optical module 340, as described earlier. The plane of the sensor substrate is substantially perpendicular to the rotation axis of a shaft 320 coupled to a knob 310 undergoing rotation 380. The end of the shaft facing the sensor module is cut flat, preferably polished to form a reflector 330 (optionally, only a portion of the shaft end could be shaped to form the reflector 330). The plane of the reflector 330 is slanted at an angle θ with respect to the substrate plane 350. In one example embodiment, the angle θ is in the range of about 0 degrees and about 90 degrees; in another example embodiment, the angle would be in the range of about 0 and 45 degrees. In yet another example embodiment, the angle θ is in the range of about 45 and about 90 degrees. The incident light 360 emitted from the LED source in the optical module 340 bounces off reflector 330 back onto the light sensors (as reflected light 365) in the optical module 340. Owing to the slanted angle of the reflector 330 and the angle distribution of the light intensity of the light source, the irradiance profile received at the photo detectors is asymmetric. The asymmetric profile received provides information on the degree of the knob's rotation.

In another example embodiment, if the shaft material cannot be polished to a sufficient reflectivity, a separate reflector may be mounted on the shaft end, at a slanted angle. The reflector can be sized such that the reflected light spot on the sensors has a boundary that partially crosses the diode configuration. In either case, the reflective surface of the shaft, whether integral to the shaft surface or a separate reflector, the size of the reflective surface is usually comparable to the size of the diode configuration. An advantage of this design is that the generated differential signals can be quite large. A corresponding design consideration is that the center of the reflector (thus also the shaft) preferably should be aligned well with the center of the sensor module to make the light spot partially cross the sensor configuration. Alternatively, the size of the reflector can be substantially larger than the size of the photo detector configuration. The optical module 340 is typically centered about the rotation axis 395. However, in practice, the lateral position of the optical module 340, in this case, is not critical for the operation, provided that the projected light from the optical module 340 is still well within the reflectance range 365. This largely relaxes the alignment tolerance for constructing the knob and optical sensor arrangement 300.

Figure 4:
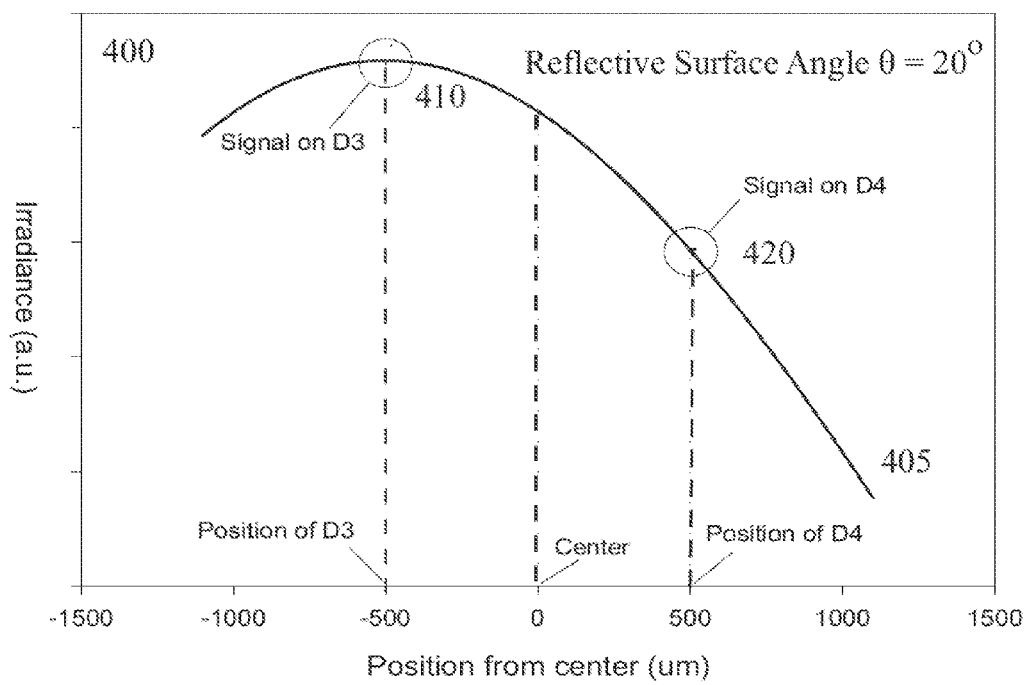
FIG. 4 is a plot of the Irradiance Profile along the X-direction of the sensor array.

Refer to FIG. 4. In an example embodiment, a plot 400 depicts an irradiance profile 405 with respect to the position from the center across photo detectors D3 and D4 when the reflector forms an angle of 20 degrees with respect to the substrate plane 350. The signal on D3 is proportional to the irradiance at position 410 and the signal on D4 is proportional to the irradiance at position 420. These two positions are plotted on curve 405. In this graph the shaft is supposed to be at the angle position such that the plane going through the shaft axis and perpendicular to the reflector surface intersects the photo detector plane along the X direction. The irradiance profile 405 is asymmetric and offset to the left in the X direction. As a consequence, irradiance at D3 is larger than that at D4, and signal output of D3 is higher than that of D4. As a result, differential signal Sx is non zero. Likewise, when the shaft is at the angle position such that the plane going through the shaft axis and perpendicular to the reflector surface intersects the photo detector plane along the Y direction, the differential signal Sy is non zero. Though not illustrated, a corresponding plot for Sy would result, as well.

Refer to FIG. 5A. If the shaft 320 is positioned at an arbitrary angle, sensors D1 and D2 generate signals which are input into differential amplifier 520 whose output is Sy. Likewise, sensors D3 and D4 generate signals which are input into differential amplifier 540 whose output is Sx. Both differential signals Sx and Sy are non-zero. Refer FIG. 5B. These two signals (Sx and Sy) form a vector S having an angle θ. Angle θ of this vector corresponds to the angle position of the shaft and therefore can represent the angle position of the shaft. FIG. 5A also includes a schematic depicting the optical sensor module in relation to the reflected light profile 550 (having a center of rotation 555) that impinges on the light sensor 510. As discussed earlier with respect to FIG. 3, thanks to the slanted reflector, the reflected light profile is asymmetric with respect to the center of the sensor configuration. The profile 550 should encompass the area covered by sensors 530 and 530', and the brightest area of the light spot is off center. The brightest area makes a circle around the sensor configuration when the shaft rotates. The center of the reflector can be shifted away from the center of the sensor configuration 530 and 530'. In a particular example embodiment, the axis of rotation 395 of the shaft 320 would be substantially centered with respect to the sensor configuration 530 and 530'.

Refer to FIG. 5B. The angle position of the shaft is mapped to angle θ of vector S. The signals Sx and Sy can be positive and negative, thus angle θ can be determined unambiguously. For example, when both Sx>0 and Sy>0, the shaft angle is in the 0-90 degree quadrant (I), when Sx<0 and Sy>0, the shaft angle is in the 90-180 degree quadrant (II), and so on; as shown in plot 505. The special cases in which Sx>0, Sy=0, Sx=0, Sy>0. Sx<0, Sy=0, and Sx=0, Sy<0, map to angles 0°, 90°, 180°, and 270°, respectively (i.e., the X and Y axes of the Cartesian coordinate space).

In another embodiment, in some applications, depicted in FIG. 3, the knob may be pressed down for a switching function separately from the angle position detection, and can return to the rest position with a spring (not shown) when the pressing force is removed. When the knob is pressed down, the reflector moves closer to the sensor surface and thus the irradiance increases equally on all photo detectors. Refer to FIG. 6. Plot 600 of the Irradiance v. Position from Center shows two curves 605 and 605' corresponding to the knob "button" rest position and pressed position, respectively. Sensors D3 at the rest position 610 and pressed position 610' and sensor D4 at rest position 620 and pressed position 620' are shown. By monitoring the common mode signal (i.e. the sum of signals coming from at least two photo detectors or from all photo detectors) the switching action may be detected, separately from the differential signals that give the angle information. Using these principles a knob with switch also could be designed wherein the switch is actuated by pulling the knob upward (the reflectance curves of FIG. 6 would be swapped so that the "normal" curve lies above the pulled curve's position).

Alternatively, in another embodiment, the derivative with respect to time of the common mode signal can be monitored. By putting a threshold on the derivative, the press action can be more easily detected. Essentially, the speed of the button push is monitored.

In another example embodiment according to the present invention, the shaft does not necessary have to be a user-operated knob. Such a shaft may be present on miniaturized mechanical systems such as a hard disk drive, optical disk drives, cooling fans, etc. Within the disk drive motor assembly, the shaft at one end may have an oblique reflective surface bevel cut at a predetermined angle θ. Without consuming significant space, the optical module may be placed in proximity to the shaft's axis of rotation. The rotation body having a receptacle to align the shaft with the light source and photo detectors within the optical module.

Supporting electronics fabricated with the optical angle sensor will measure the rotational position of the shaft with respect to time, thereby providing a speed monitor. Such a monitor provides an early indication of hard drive failure in that hard disks are specified to run at particular speeds, for example 5400 rpm, 7200 rpm, or 9600 rpm (for specialized high-speed drives). Deviations from rated speed may indicate that the drive is not ready to receive data or that failure is imminent. Such failure may result from wear of the mechanical bearings that enable to hard disk platters to spin freely. The user, being presented with an early warning of hard drive failure, can take prudent steps to make a backup of valuable data.

Refer back to FIG. 6. In another application for monitoring the speed of the motor shaft in accordance with an embodiment of the present invention, the vertical position of the shaft may be monitored as well. When the hard drive is started, there is a specified amount of vertical play (in a predetermined direction) of the shaft—albeit a very small amount. This vertical play may be monitored. The rotating shaft having the oblique reflective surface moves closer to the optical sensor module (much like the knob being in the rest position 605 and the pressed position 605').

A technique to address the detection of signals may be found in PCT application of Kim Le Phan titled, "Method and Device for Processing Signals form a Pointing Device" filed on Aug. 11, 2009 (International Application No. PCT/IB2009/053520), published on Feb. 25, 2010 (WO2010/020906 A1) provides more detailed background information on the aforementioned discussion of the processing of signals used in reference to the present invention. The reader is referred to the Appendix.

In another embodiment, knowing the angle position of the shaft at any time, the rotation speed can also be calculated. Within the optical sensor module, circuits for determining the time elapsed may be included. Thus, as one rotates the knob from a first angle position to another angle position, the change of angle with respect to time gives the angular velocity. Circuits to measure the elapsed time between the rotation of a knob from a first position to a second position may be designed by one skilled in the art.

A technique to address the detection of movements of a movable object, may be found in PCT application of Kim Le Phan titled, "Detection System for the Detection of Movements of a Movable Object, A Method of Detecting Movements of a Movable Object, and an IC having Implemented Therein the Detection System" filed on Sep. 16, 2009 (International Application No. PCT/IB2009/054036) provides more detailed background information on the aforementioned discussion of the processing of signals used in reference to the present invention. The reader is referred to the Appendix.

Numerous other embodiments of the invention will be apparent to persons skilled in the art without departing from the spirit and scope of the invention as defined in the appended claims.

Appendix

1). PCT application of Kim Le Phan titled, "Optical Pointing Device" tiled on Apr. 8, 2009 (International Application No. PCT/IB2009/051485) published on Oct. 15, 2009 (WO 2009/125360 A2), the contents of which are incorporated by reference herein.

2). PCT application of Kim Le Phan titled, "Method and Device for Processing Signals form a Pointing Device" filed on Aug. 11, 2009 (International Application No. PCT/IB2009/053520) published on Feb. 25, 2010 (WO2010/020906 A1) the contents of which are incorporated by reference herein.

3). PCT application of Kim Le Phan titled, "Detection System for the Detection of Movements of a Movable Object, A Method of Detecting Movements of a Movable Object, and an IC having Implemented Therein the Detection System" filed on Sep. 16, 2009 (International Application No. PCT/IB2009/054036), the contents of which are incorporated by reference herein.

The invention claimed is:

1. A system for detecting rotation of a knob in an apparatus, the system comprising:
    a shaft having a predetermined length and a first end and a second end, the second end having an oblique reflective surface defined thereon, the first end fixedly attached to the knob;
    a rotation body containing the shaft, the rotation body having a receptacle to accommodate the second end of the shaft, the oblique reflective surface of the second end being exposed;
    an optical module on an integrated circuit substrate and optically coupled to the rotation body, the optical module detecting light irradiance from the exposed oblique reflective surface, the optical module including,
    a solid state light source;
    a plurality of photo detectors each of which generate an electrical signal upon exposure to at least a threshold amount of light, arranged about the light source on a plane in at least two pairs, each pair defining a first and a second direction parallel to the plane, the first and the second directions being perpendicular to each other;
    wherein the oblique reflective surface generates an asymmetric irradiance profile as light from the solid-state light source is reflected back to the plurality of photo detectors;
    wherein each pair of photo detectors generates a first electrical signal and a second electrical signal in response to the irradiance profile of the oblique reflective surface; and
    the optical module detecting a change in the asymmetric irradiance profile from the oblique reflective surface of the shaft as the knob is rotated;
    wherein the asymmetric irradiance profile is arranged within a boundary at least partially covered by the plurality of photo detectors;
    wherein the knob is equipped with a spring, the knob being movable between a rest position and a moved position, the moved position being attained in response to the application of a vertical force upon the knob, the spring returning the knob to the rest position upon release of the vertical force; and
    wherein the moved position of the knob is at least one of the following: a pulled position, a pushed position;
        furthermore upon the knob attaining the pressed position, the irradiance profile of the oblique reflective surface has a higher intensity in the pressed position than that of the rest position; and
        furthermore upon the knob attaining the pulled position, the irradiance profile of the oblique reflective surface has a lower intensity in the pulled position than that of the rest position.

2. The system as recited in claim 1, wherein an axis of rotation of the shaft is substantially centered relative to the solid state light source.

3. The system as recited in claim 2, wherein the degree of shaft rotation is in the range of about 0° to about 360°.

4. The system as recited in claim 3, wherein the angle of the oblique reflective surface relative to a direction in which light is emitted from the solid state light source is about 45°.

5. The system as recited in claim 2, wherein the angle of the oblique reflective surface relative to a direction in which light is emitted from the solid state light source is in the range of about 0° and 90°.

6. The system as recited in claim 2, wherein the angle of the oblique reflective surface relative to a direction in which light is emitted from the solid state light source is in the range of about 22° and 68°.

7. The system as recited in claim 2, wherein the angle of the oblique reflective surface relative to a direction in which light is emitted from the solid state light source is in the range of about 5° to 30°.

8. The system as recited in claim 2 wherein the oblique reflective surface is formed on the second end of the shaft by one of the following: directly polishing the second end of the shaft to a predetermined angle, grinding the second end of the shaft to a predetermined angle and attaching a reflective surface to the second end.

9. The system as recited in claim 1, wherein each pair of photo detectors is coupled to a differential circuit, each differential circuit receiving the first electrical signal and the second electrical signal, and in response, generating non-zero differential output signals, Sx and Sy, representing an X-coordinate and Y-coordinate, respectively.

10. The system as recited in claim 9, wherein the non-zero differential output signals define a vector having an angle, the angle of the vector representing the degree of shaft rotation.

11. The system as recited in claim 9, wherein the degree of shaft rotation is indicated by arrangement of the following Signals: Sx >0, Sy>0 represents the Angle θ at about 0° to about 90°, Sx<0, Sy>0 represents the Angle θ at about 90° to about 180°, Sx<0, Sy<0 represents the Angle θ at about 180° to 270°, and Sx>0, Sy<0 represents the Angle θ a about 270° to about 360°.

12. The system as recited in claim 1, wherein the intensity of the irradiance profile is measured by at least one of the following:
   monitoring the common-mode signal of all at least two photo detectors; and
   monitoring the derivative of the common-mode signal with respect to time, as the knob is depressed.

13. A system for detecting a degree of rotation of a motor shaft, the motor shaft having an exposed oblique reflective surface defined thereon, the system comprising:
   a rotation body accommodating the exposed oblique reflective surface of the motor shaft,
   an integrated circuit optical module optically coupled to the rotation body, the optical module containing a solid state light source and a plurality of photo detectors arranged to detect an asymmetric irradiance profile as light from the solid-state light source is reflected back from the exposed oblique reflective surface to the plurality of photo detectors, the plurality of photo detectors generating an output representing a vector having a magnitude and an angle, the vector representing the degree of rotation of the motor shaft;
   a circuit for calculating the degree of rotation with respect to time thereby measuring the speed of the motor shaft; and
   a circuit for calculating a vertical displacement of the motor shaft from a stopped state to a running state thereby measuring an amount of vertical play of the motor shaft.

14. A method for detecting the degree of rotation of a shaft in an apparatus, the shaft having a predetermined length and a first end and a second end, the second end having an oblique reflective surface defined thereon, the method comprising:
   inserting the second end of the shaft into a rotation body having a receptacle to accommodate the second end of the shaft,
   optically coupling an integrated circuit optical module to the rotation body, the optical module containing a solid state light source and a plurality of photo detectors;
   detecting an asymmetric irradiance profile as light from the solid-state light source is reflected back from the exposed oblique reflective surface to the plurality of photo detectors,
   generating an output from the plurality of photo detectors, the output representing a vector having a magnitude and an angle;
   determining the degree of rotation of the shaft from the vector representation;
   calculating the degree of rotation with respect to time thereby measuring the speed of the shaft; and
   calculating a vertical displacement of the shaft from a stopped state to a running state thereby measuring an amount of vertical play of the shaft.

* * * * *